Feb. 10, 1953 E. A. HERIDER ET AL 2,627,894

AUTOMOBILE SEAT CONSTRUCTION

Filed Dec. 15, 1945 2 SHEETS—SHEET 1

ELMER A. HERIDER
STEWART E. NORWOOD
INVENTORS.

BY
ATTORNEYS.

Feb. 10, 1953  E. A. HERIDER ET AL  2,627,894
AUTOMOBILE SEAT CONSTRUCTION

Filed Dec. 15, 1945  2 SHEETS—SHEET 2

STEWART E. NORWOOD
ELMER A. HERIDER
INVENTOR.

BY Edwin C. McRae
Robert G. Harris
John R. Faulkner
Thomas H. Oster
ATTORNEYS

Patented Feb. 10, 1953

2,627,894

UNITED STATES PATENT OFFICE 2,627,894

AUTOMOBILE SEAT CONSTRUCTION

Elmer A. Herider and Stewart E. Norwood, Dearborn, Mich., assignors to Ford Motor Company, Dearborn, Mich., a corporation of Delaware Application December 15, 1945, Serial No. 635,314

2 Claims. (Cl. 155—5)

An object of our invention is to provide an automobile seat of simple, durable and inexpensive construction.

A further object of our invention is to provide an automobile seat construction especially adapted for use in closed cars of the "Tudor" model. Such bodies are provided with only one door in each side, but are equipped with full width front and rear seats. Our invention consists of an improved front seat construction whereby the front seat backs may be swung forward to permit easier ingress and egress through either door to the rear seat.

Still a further object of our invention is to provide a front seat construction which swings forward and inward to clear the door operating handles so as to allow the use of a seat back which extends the full width of the car body. In the streamlined automobile in use today, the bodies have a width at their center portions nearly the full width of the car. In the "Tudor" type body the back of the front seat is located substantially at the center of the car and for comfort should be nearly the full width of the body at this point. However, with the conventional seat back hinge, a full width back interferes with the door operating handles when in forward position and is objectionable for this reason. This is particularly annoying when the driver or passenger, after getting out of the car, swings the front seat forward in order to remove a bundle or the like from the rear compartment and then attempts to close the door without first replacing the seat to its rearmost position. Returning the seat before closing the door is very inconvenient when a person has packages to carry. If the seat is not returned, the door strikes against the seat back and cannot be closed.

For this reason many manufacturers are providing backs on the front seats which only extend a portion of the width across the car.

Our improved seat construction is designed to overcome this defect by causing each half of the seat back to swing forward and inward so as to clear the door and all parts thereof in any of its positions.

Still another object of this invention is to provide a particular hinge construction for the seat backs whereby the crushing and abrading action which occurs between the seat and seat back when the seat back is hinged forward is avoided. This phenomenon is particularly objectionable in the area adjacent the center hinge. In former construction an attempt to avoid this trouble was made by compacting the lower inward portion of the seat back, but this involved an additional operation and was only partially satisfactory. The present invention removes the necessity for such expedients.

Our invention consists in the arrangement, construction and combination of the various parts of an improved device as described in the specification, claimed in our claims and illustrated in the accompanying drawing in which:

In these several figures, like members are designated by like numbers.

Figure 1:
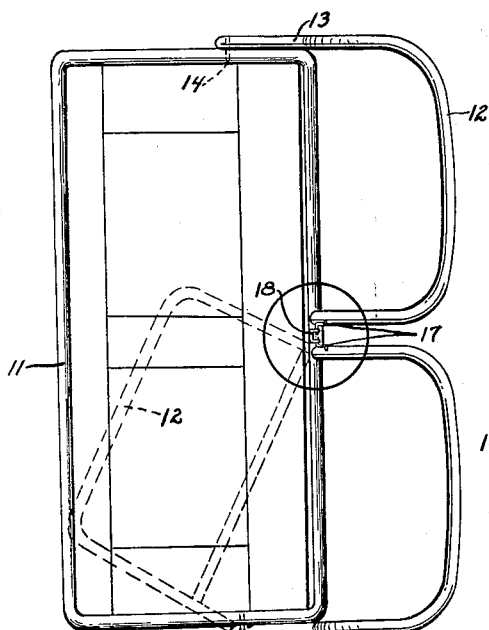
Figure 1 is a plan view of the seat frame with the seat back frame attached.

Turning to these drawings, and more particularly to Figure 1, the number 11 has been used to designate a horizontal tubular seat frame upon which is built up the front seat 15. Similarly 12 designates a tubular seat back frame upon which is built up a seat back 16. To seat back frame 12 is welded seat back frame hinge extension 13 which is pivotally mounted upon seat frame 11 as shown by means of pin 14. In this figure and the following figures, the dotted lines indicate the position assumed by the seat back frame 12 when the seat back is tilted forward. To reach the position shown in the dotted lines, the seat back frame 12 is tilted or rotated about an axis between hinge pin 14 and crank hinge pin 19. Hinge pin 14 is secured by welding to the outside side of seat frame 11 at a point placed well forward of the rear edge. Crank hinge pin 19 is secured to the inside side of seat back frame 12 by welding. Hinge extension 13 is drilled to provide a pivot in which hinge pin 14 rotates.

Figure 4:
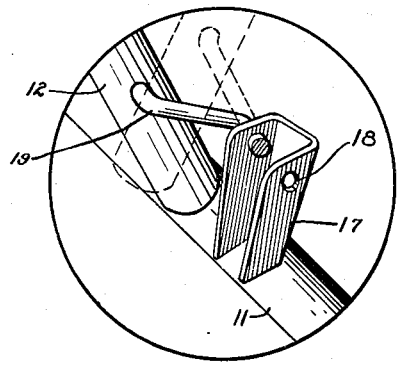
Figure 4 is a perspective view of the circled portion of Figure 1 showing a detail of the hinge structure.

Turning now to Figure 4, a U-shaped bracket 17 is secured to seat frame 11 and is drilled to provide a center hinge pivot opening 18 in which crank hinge pin 19 rotates. It will be noted that one end of crank hinge pin 19 is secured firmly to seat back frame 12. The throw of crank hinge pin 19 is inclined forward and downward when the seat back is in the normal position as shown in Figure 4. This places the spot at which crank hinge pin 19 is welded to seat back frame 12 to the rear and above center hinge pivot opening 18.

Figure 2:
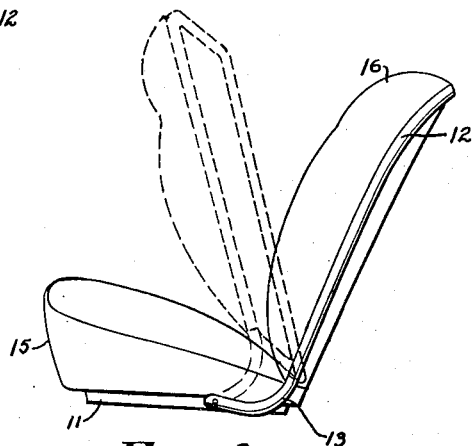
Figure 2 is a side elevation of the seat structure.
Figure 3:
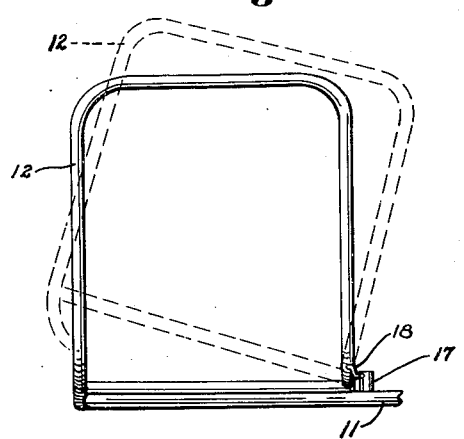
Figure 3 is a rear elevation of the seat frame with the seat back attached.

When the seat is tilted forward, the fact that the point of attachment of the crank hinge pin 19 is eccentric with regard to the axis of rotation of the seat back frame 12 causes this seat back frame to be lifted upward. The seat back frame then assumes the position shown in Figures 2 and 3 and this upward lift obviates to a great extent the crushing and abrading action which would otherwise occur between seat cushion 15 and seat back cushion 16 in the vicinity of the center hinge.

Thus it will be seen a simple expedient has been provided to permit the use of an inconspicuous and short center hinge pivot member and at the same time eliminate the need for especially upholstering that part of the seat near the center post.

Figure 5:
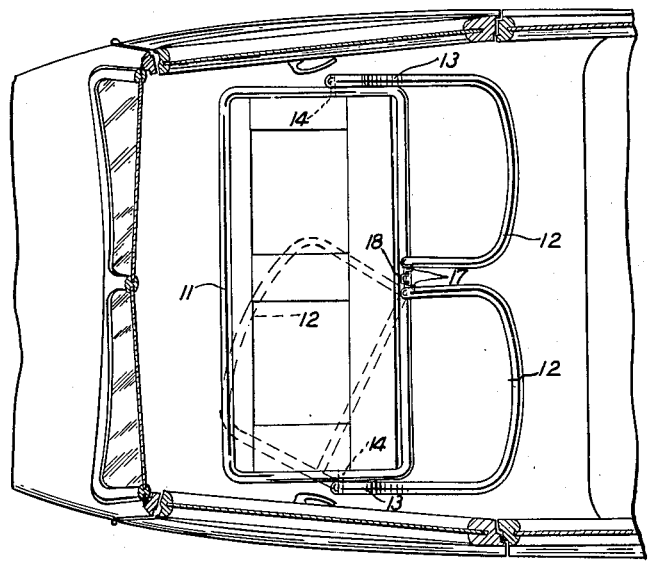
Figure 5 is a plan view, partly in section showing our improved seat structure in relationship to the remainder of the automobile body.

It is thought that Figure 5 needs little elaboration. In this figure of drawing, the substance of Figure 1 has been shown in place in a partially sectioned plan view of an automobile body to demonstrate the relationship between these seats and the body proper.

This application represents an improvement upon our earlier Patent 2,132,729, issued October 11, 1938, to Joseph Galamb and Clarence F. Kramer.

Some changes may be made in the arrangement, construction and combination of the various parts of our improved device without departing from the spirit of our invention, and it is our intention to cover by our claims such changes as may be reasonably included within the scope thereof.

We claim as our invention:

1. An automobile closed body construction characterized by having front and rear seats therein and having a single door in one side thereof, said door being longitudinally positioned in alignment with the front seat, a seat back frame positioned adjacent the door and hinged to the rear edge of the front seat by inner and outer hinge members to swing forwardly around an axis which extends rearwardly and upwardly toward the longitudinal center line of the body, the inner hinge member comprising a crank shaped member one end of which is rigidly secured to the seat back at a point eccentric with respect to such axis.

2. An automobile closed body construction characterized by having front and rear seats therein and having a single door in one side thereof, said door being longitudinally positioned in alignment with the front seat, a seat back positioned adjacent to the door and hinged to the rear edge of the front seat frame by inner and outer hinge members to swing forwardly around an axis which extends rearwardly and upwardly toward the longitudinal center line of the body, the inner hinge member comprising a crank shaped member one end of which is rigidly secured to the seat back at a point eccentric with respect to such axis, the throw of said crank extending in a forward and downward direction.

ELMER A. HERIDER.
STEWART E. NORWOOD.

REFERENCES CITED

The following references are of record in the file of this patent:

UNITED STATES PATENTS

| Number | Name | Date |
| --- | --- | --- |
| 1,339,611 | White | May 11, 1920 |
| 1,947,980 | Feyrer | Feb. 20, 1934 |
| 2,120,156 | Simpson | June 7, 1938 |
| 2,132,729 | Galamb et al. | Oct. 11, 1938 |
| 2,160,482 | McGregor | May 30, 1939 |
| 2,177,892 | Kaiser | Oct. 31, 1939 |
| 2,189,396 | Greig | Feb. 6, 1940 |
| 2,399,563 | Neely | Apr. 30, 1946 |